(12) United States Patent
Stikeleather et al.

(10) Patent No.: US 11,362,458 B2
(45) Date of Patent: Jun. 14, 2022

(54) BIDIRECTIONALLY INSTALLABLE INTERMEDIATE MODULAR ADAPTER FOR A RACK-MOUNTED PANEL

(71) Applicant: Optical Cable Corporation, Roanoke, VA (US)

(72) Inventors: Derrick Stikeleather, Black Mountain, NC (US); Sumio Seo, Wallingford, VT (US); Jamey O. Calloway, Weaverville, NC (US)

(73) Assignee: Optical Cable Corporation, Roanoke, VA (US)

( * ) Notice: Subject to any disclaimer, the term of this patent is extended or adjusted under 35 U.S.C. 154(b) by 0 days.

(21) Appl. No.: 17/224,388

(22) Filed: Apr. 7, 2021

(65) Prior Publication Data

US 2021/0226377 A1    Jul. 22, 2021

Related U.S. Application Data

(63) Continuation-in-part of application No. 16/750,605, filed on Jan. 23, 2020, now Pat. No. 11,276,969, which is a continuation-in-part of application No. 16/291,929, filed on Mar. 4, 2019, now abandoned.

(60) Provisional application No. 62/637,681, filed on Mar. 2, 2018.

(51) Int. Cl.
*H01R 13/73* (2006.01)
*H01R 13/518* (2006.01)
*H01R 24/64* (2011.01)

(52) U.S. Cl.
CPC .......... *H01R 13/518* (2013.01); *H01R 13/73* (2013.01); *H01R 24/64* (2013.01)

(58) Field of Classification Search
CPC .............. H01R 13/743; H01R 23/7042; H01R 23/7026; H01R 33/46; H01R 13/742; H01R 13/74
See application file for complete search history.

(56) References Cited

U.S. PATENT DOCUMENTS

| | | | |
|---|---|---|---|
| 6,764,312 B2 * | 7/2004 | Ushiro | H01R 12/7082 439/33 |
| 7,967,624 B2 * | 6/2011 | Wang | H01R 13/745 439/248 |
| 8,657,622 B1 * | 2/2014 | Wang | H01R 13/745 439/553 |

(Continued)

*Primary Examiner* — Phuong Chi Thi Nguyen
(74) *Attorney, Agent, or Firm* — William G. Heedy; The Van Winkle Law Firm

(57) ABSTRACT

A bidirectionally installable intermediate modular adapter for a rack mounted panel is provided, including a front face, an opposing rear face, a first side surface and opposing second side surface each comprising a spring tab latch and spring tab latch receiver. The spring tab latch comprises a first ramp positioned towards the front face and a second ramp positioned towards the opposing rear face, a groove defined at least in part by the first ramp and second ramp, a first latch arm positioned towards the front face, a second latch arm positioned towards the opposing rear face, a spring tab latch connector positioned towards the spring tab receiver, and a compression spring. At least one opening extends from the front face through the body to the opposing rear face and an upper surface comprises a groove extending at least partially lengthwise across the upper surface.

20 Claims, 12 Drawing Sheets

(56) References Cited

U.S. PATENT DOCUMENTS

2017/0207551 A1* 7/2017 Ray ........................ H02G 15/06

* cited by examiner

SECTION A-A

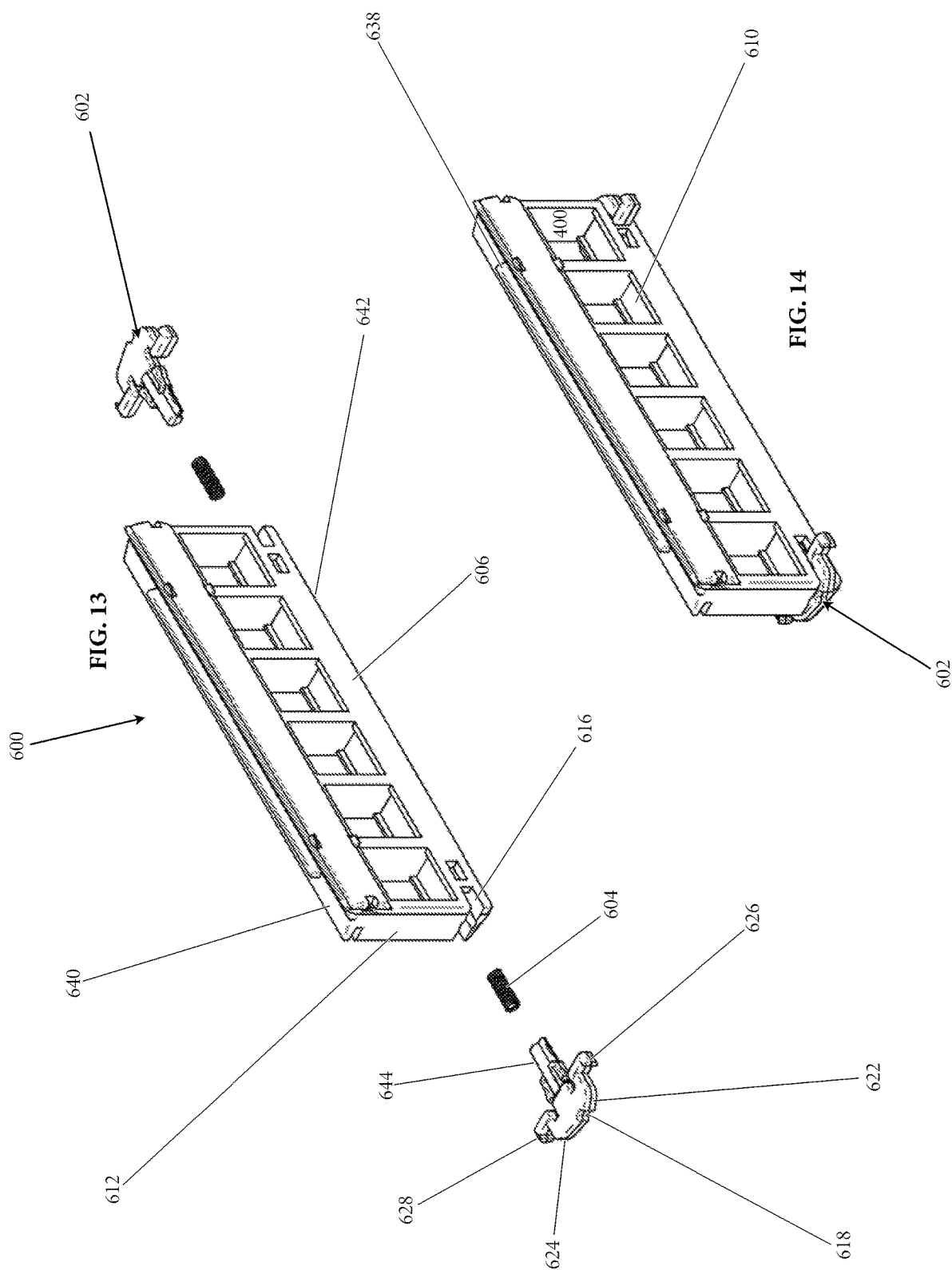

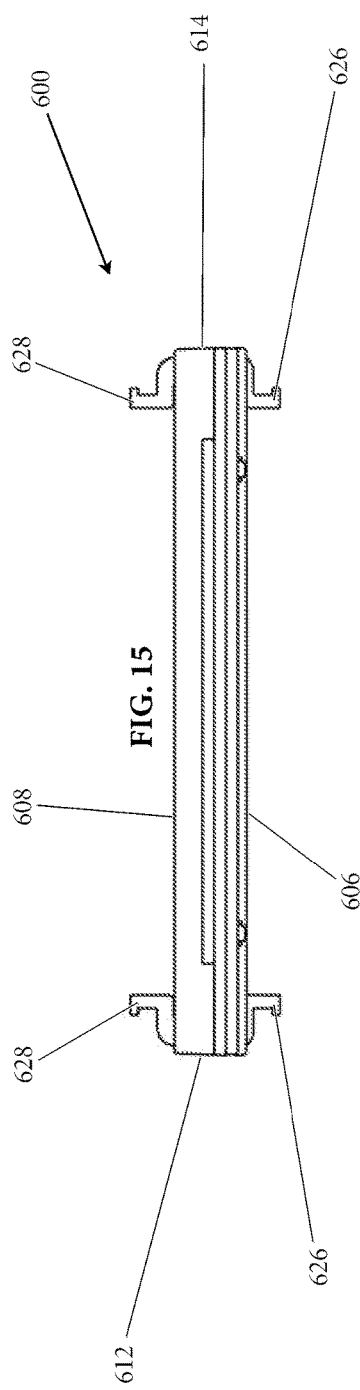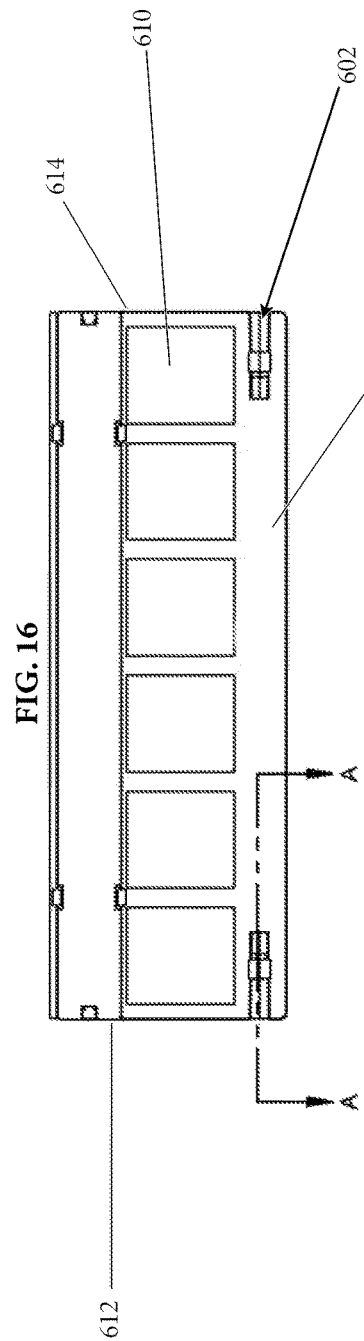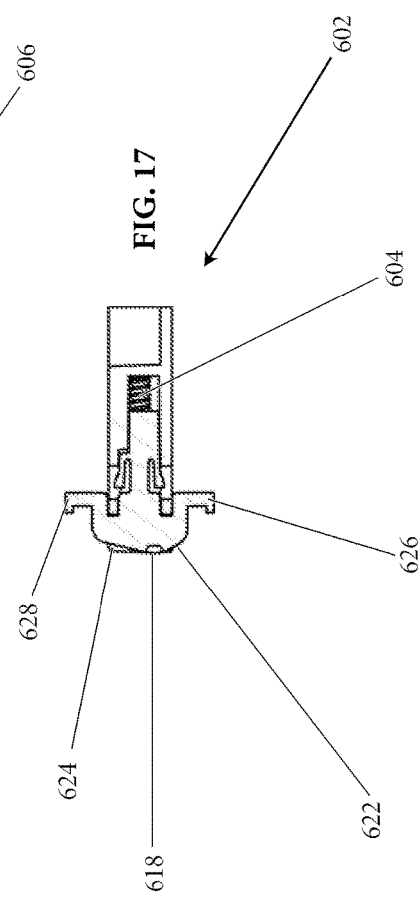

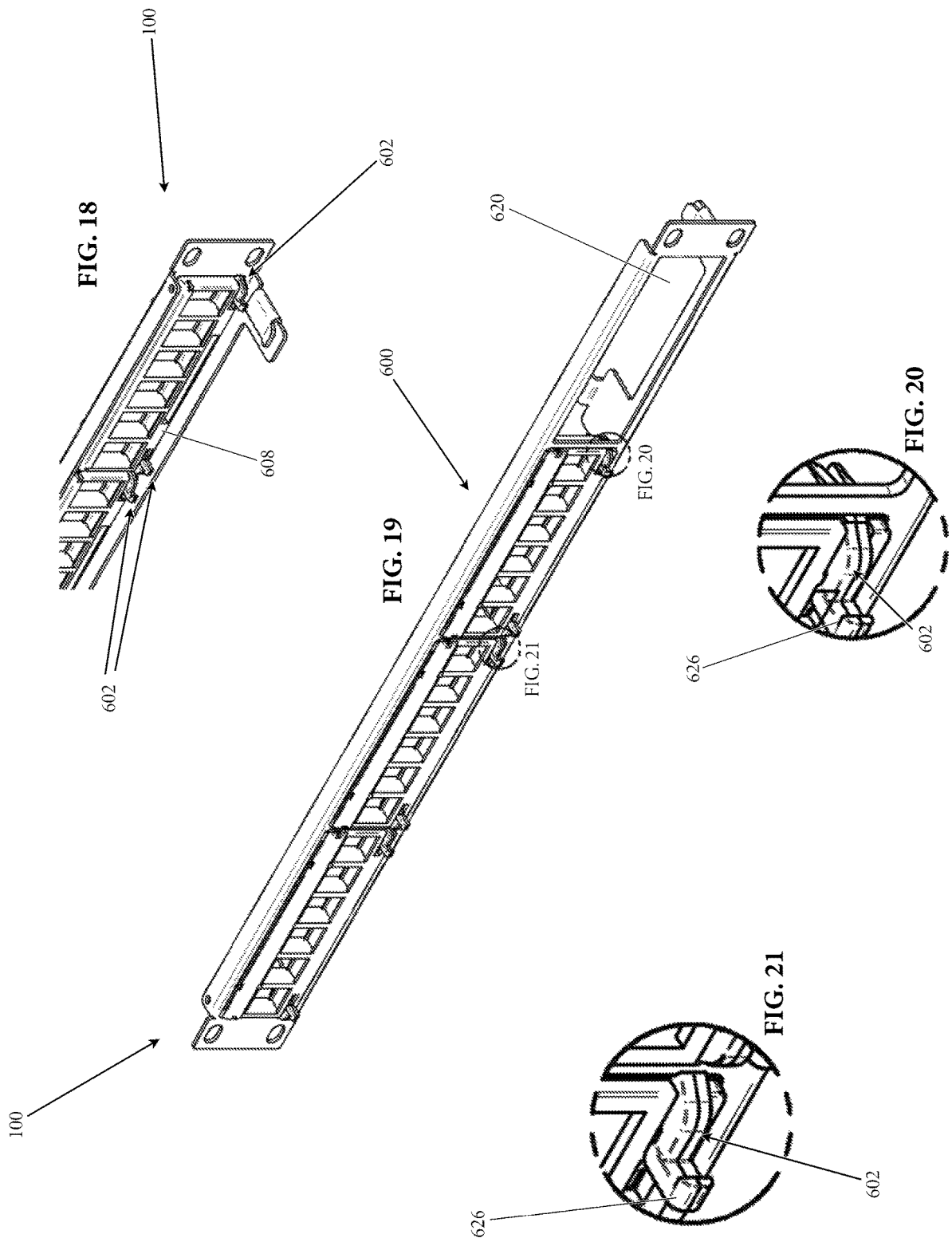

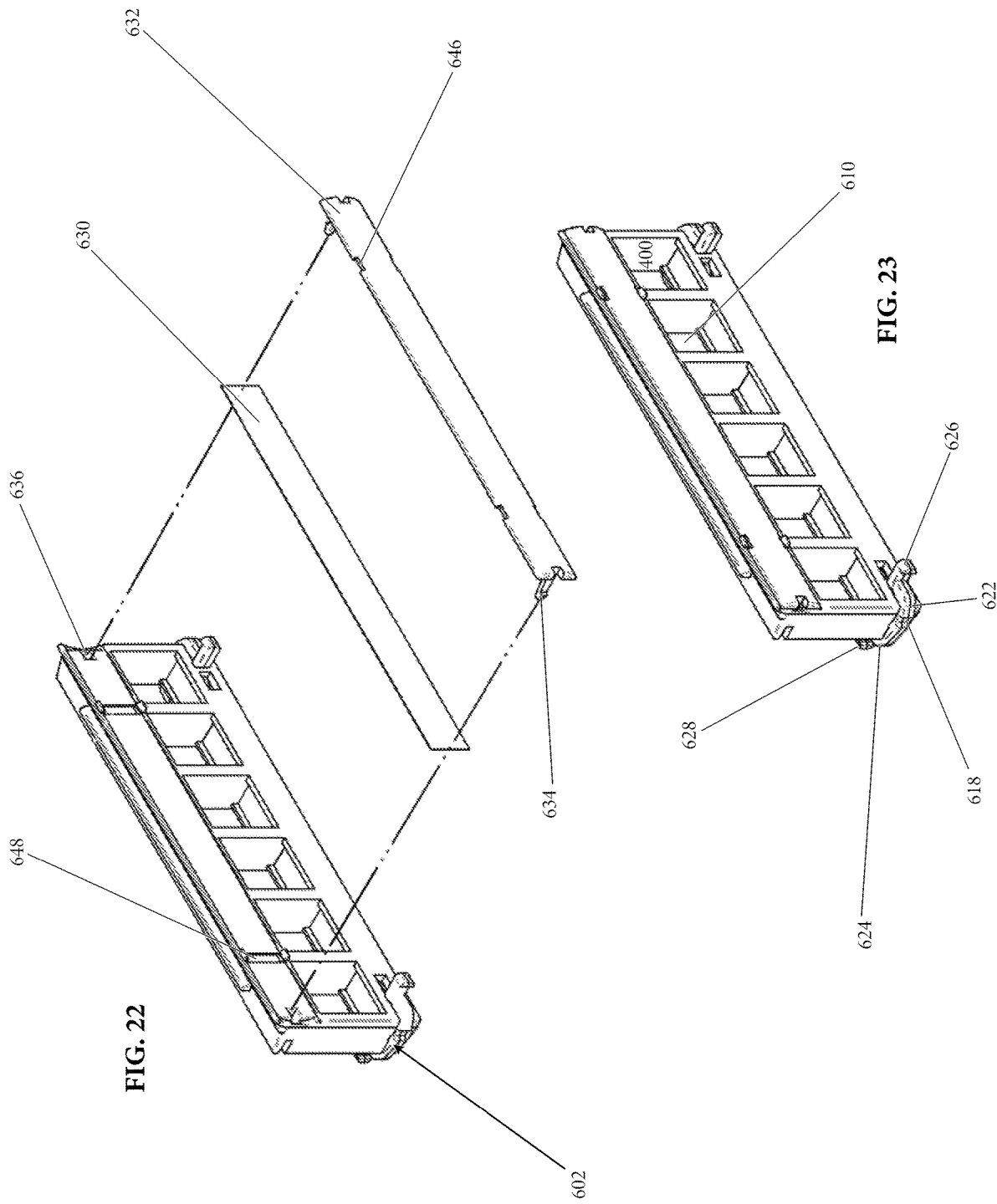

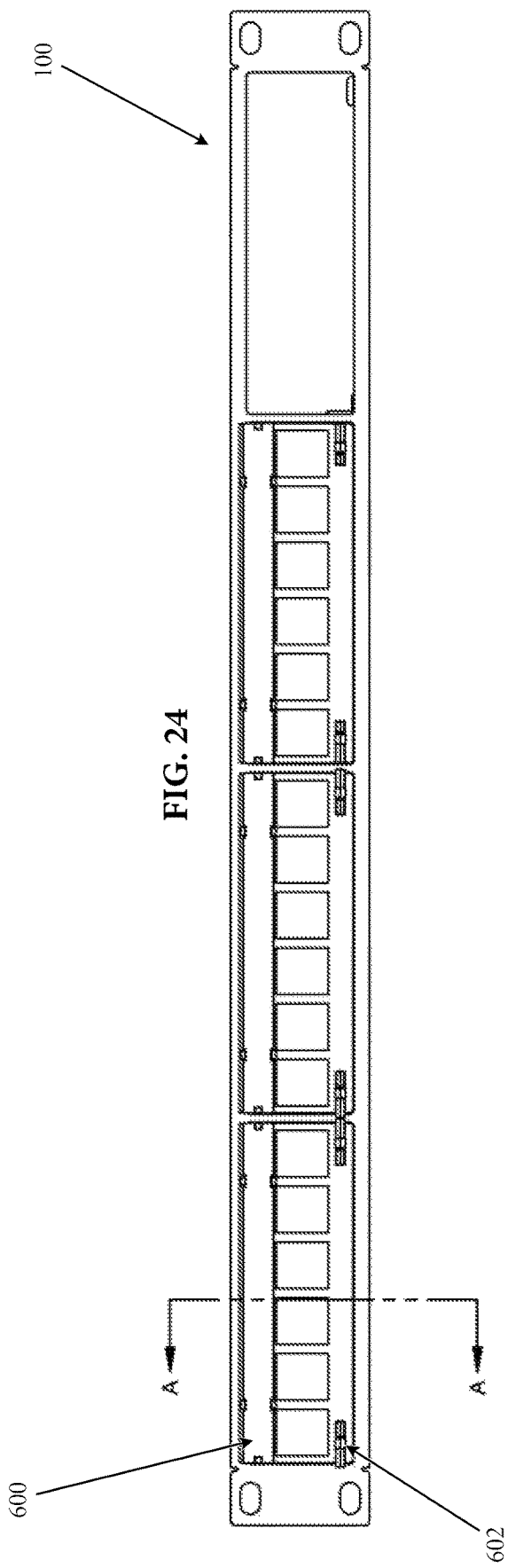
FIG. 24
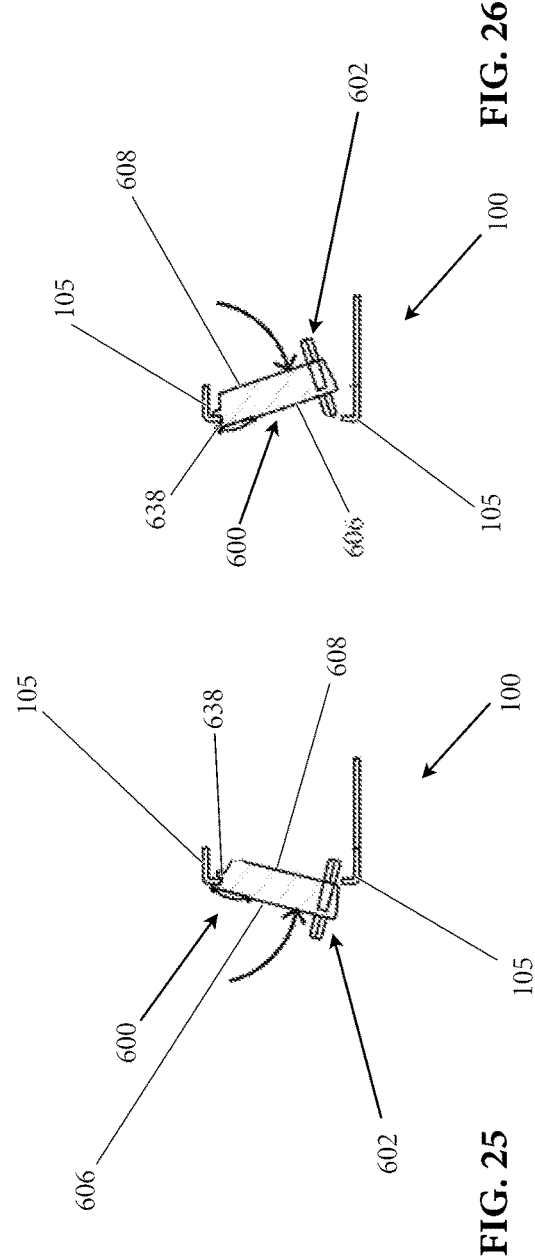
FIG. 25
FIG. 26

BIDIRECTIONALLY INSTALLABLE INTERMEDIATE MODULAR ADAPTER FOR A RACK-MOUNTED PANEL

RELATED APPLICATIONS

This application is a Continuation-in-Part application of co-pending U.S. Nonprovisional patent application Ser. No. 16/750,605 filed on Jan. 23, 2020, entitled "Bidirectionally Installable Intermediate Modular Adapter for a Rack-Mounted Panel," which is a Continuation-in-Part of U.S. Nonprovisional patent application Ser. No. 16/291,929 filed Mar. 4, 2019, entitled "Plated Modular Adapter," which claims priority to and incorporates entirely by reference U.S. Provisional Patent Application Ser. No. 62/637,681 filed on Mar. 2, 2018, entitled "Plated Modular Adapter."

FIELD OF INVENTION

This invention relates to modular adapters for mounting different styles of connectors and, more particularly, to a bidirectionally installable intermediate modular adapter with lateral spring tabs for a rack-mounted panel.

BACKGROUND OF THE INVENTION

RJ-45 style Ethernet connectors are often mounted within a standard sized 19-inch wide rack by means of metal or plastic mounting panels. These mounting panels are typically manufactured with cutouts for use with specific types of connectors, meaning that different panels are needed for different particular types or styles of connectors, thus requiring multiple part numbers to identify the multiple different panels.

In order to simplify and modularize panel design, the cutouts or openings in a rack-mounted panel can be made larger. Utilizing larger openings in the rack-mounted panel allows for connectors to be mounted in an intermediate modular adapter, which can be molded from inexpensive plastic compounds and sized for receipt in the larger openings of the rack mounted panel. For example, an intermediate modular adapter may be designed such that the outer portion has dimensions which allow it to fit within the larger panel openings, while the inner area or openings within could be made to fit different styles of connectors, such as a 6-port data module or some number of discreet keystone modular jack ("KMJ") style connectors.

An intermediate modular adapter is installed from the front of the panel, and the connectors are installed from the rear of the intermediate modular adapter, so the intermediate modular adapter is not installed into the panel until after the wiring from the connectors has been drawn through the opening in the panel. This can be a tedious and time-consuming process, especially if the wiring comprises numerous and/or long cables.

Further, removing and/or replacing such an intermediate modular adapter, such as when the intermediate modular adapter has been damaged, is also a tedious and time-consuming process, especially if the wiring comprises numerous and/or long cables.

SUMMARY OF THE INVENTION

In accordance with one form of the invention, a bidirectionally installable intermediate modular adapter for a rack mounted panel is provided. The bidirectional intermediate modular adapter comprises a body. The body includes a first face and an opposing second face, at least one opening extending from the first face through the body to the opposing second face, a first side surface comprising a spring tab latch and a spring tab latch receiver, an opposing second side surface comprising a spring tab latch and a spring tab latch receiver, an upper surface, and an opposing lower surface.

In accordance with another form of the invention a bidirectionally installable intermediate modular adapter for a rack mounted panel is provided. The bidirectional intermediate modular adapter comprises a body, including a front face and an opposing rear face, at least one opening extending from the front face through the body to the opposing rear face, a first side surface comprising a spring tab latch and spring tab latch receiver, an opposing second side surface comprising a spring tab latch and spring tab latch receiver, an upper surface comprising a groove extending at least partially lengthwise across the upper surface, and an opposing lower surface.

In accordance with another form of the invention, a bidirectionally installable intermediate modular adapter for a rack mounted panel is provided. The bidirectional intermediate modular adapter comprises a body. The body includes a front face and an opposing rear face, the front face being forward of a first side surface and a second side surface, the first side surface comprising a spring tab latch and spring tab latch receiver and the opposing second side surface comprising a spring tab latch and spring tab latch receiver. The spring tab latch comprises a first ramp positioned towards the front face and a second ramp positioned towards the opposing rear face, a groove defined at least in part by the first ramp and second ramp, a first latch arm positioned towards the front face, a second latch arm positioned towards the opposing rear face, a spring tab latch connector positioned towards the spring tab receiver, and a compression spring located inside the spring tab latch connector. At least one opening extends from the front face through the body to the opposing rear face, an upper surface comprises a groove extending at least partially lengthwise across the upper surface, and an opposing lower surface is opposite the lower surface.

BRIEF DESCRIPTION OF THE DRAWINGS

For a fuller understanding of the nature of the present invention, reference should be made to the following detailed description, taken in conjunction with the accompanying drawings in which:

FIG. 13 is an exploded front perspective view of a bidirectional intermediate modular adapter, showing the spring tab latch assembly;

FIG. 14 is a front perspective view of a bidirectional intermediate modular adapter;

FIG. 15 is a top view of a bidirectional intermediate modular adapter;

FIG. 16 is a front view of a bidirectional intermediate modular adapter;

FIG. 17 illustrates a cutaway view along line A-A of FIG. 16, showing a spring tab latch assembly;

FIG. 18 is a rear perspective view of a mounting panel, showing a bidirectional intermediate modular adapter installed in a mounting panel;

FIG. 19 is a front perspective view of a mounting panel, showing a plurality of bidirectional intermediate modular adapters installed therein;

FIG. 20 is an isolated view taken from FIG. 19, showing a depressed spring tab latch;

FIG. 21 is an isolated view taken from FIG. 19, showing an engaged spring tab latch;

FIG. 22 is an exploded front perspective view of a bidirectional intermediate modular adapter, showing the writable surface and transparent window face;

FIG. 23 is a front perspective view of a bidirectional intermediate modular adapter;

FIG. 24 is a front view of a mounting panel, showing bidirectional intermediate modular adapters installed;

FIG. 25 illustrates a cutaway view along line A-A of FIG. 24, showing a bidirectional intermediate modular adapter inserted from the front of a mounting panel; and FIG. 26 illustrates a cutaway view along line A-A of FIG. 24, showing a bidirectional intermediate modular adapter inserted from the rear of a mounting panel.

Like reference numerals refer to like parts throughout the several views of the drawings.

DETAILED DESCRIPTIION

Referring to the several views of the drawings, the plated plastic intermediate modular adapter for mounting panels is shown and described herein.

Figure 1:
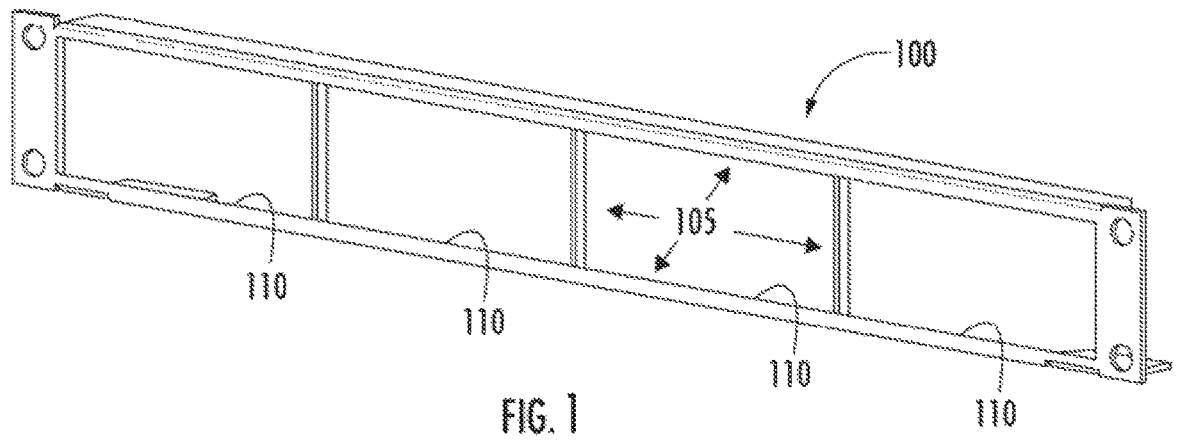
FIG. 1 is an exemplified illustration of a metal mounting panel with four cutouts.

Referring initially to FIG. 1, a metal mounting panel 100 is illustrated. The metal mounting panel 100 includes four large cutouts 110. The four large cutouts 110 form internal edges 105 on the mounting panel 100.

Figure 2A:
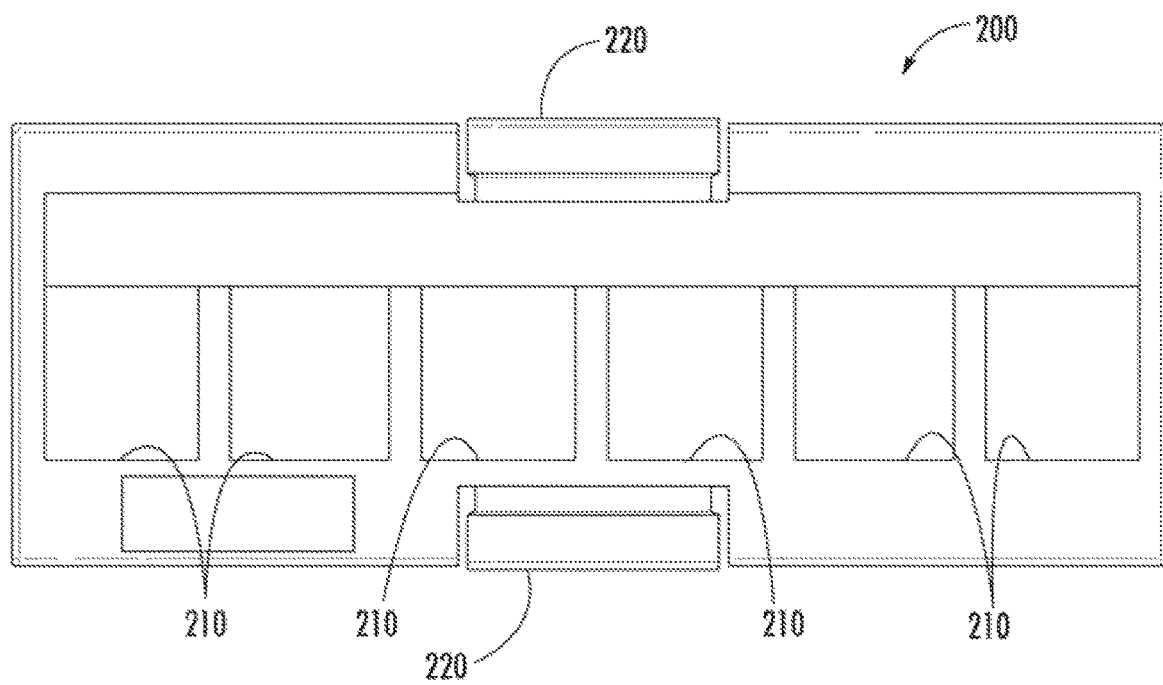
FIGS. 2A-2C are a front view, rear view, and perspective view, respectively, of a plastic intermediate modular adapter.
Figure 2B:
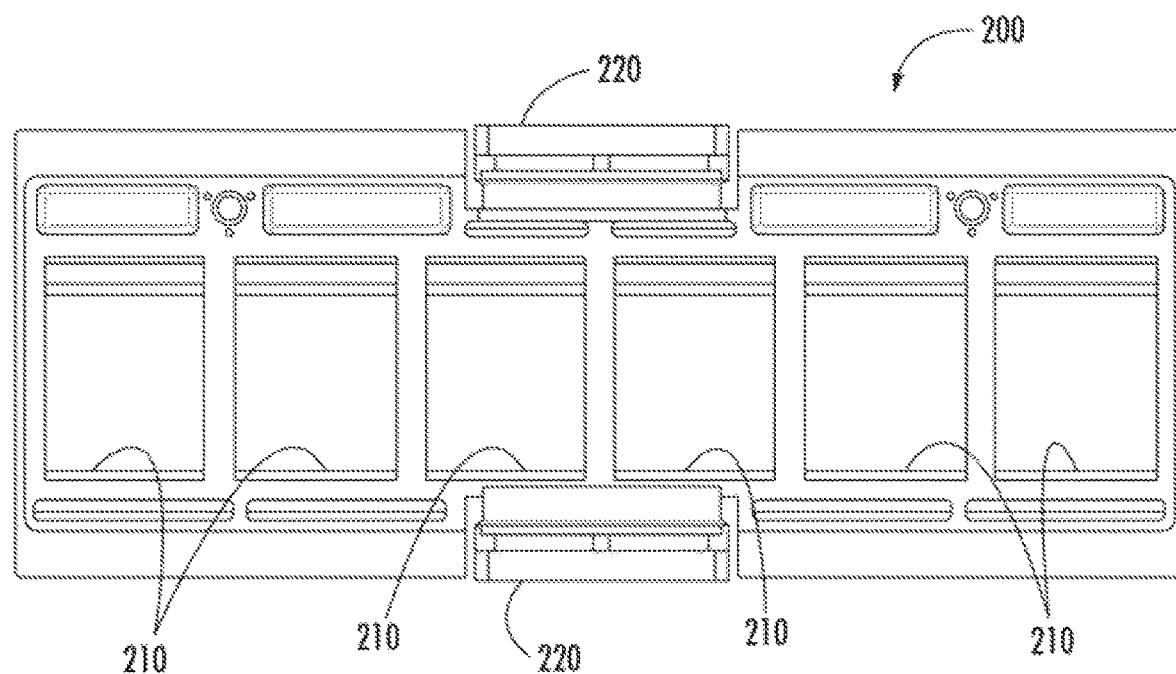
Figure 2C:
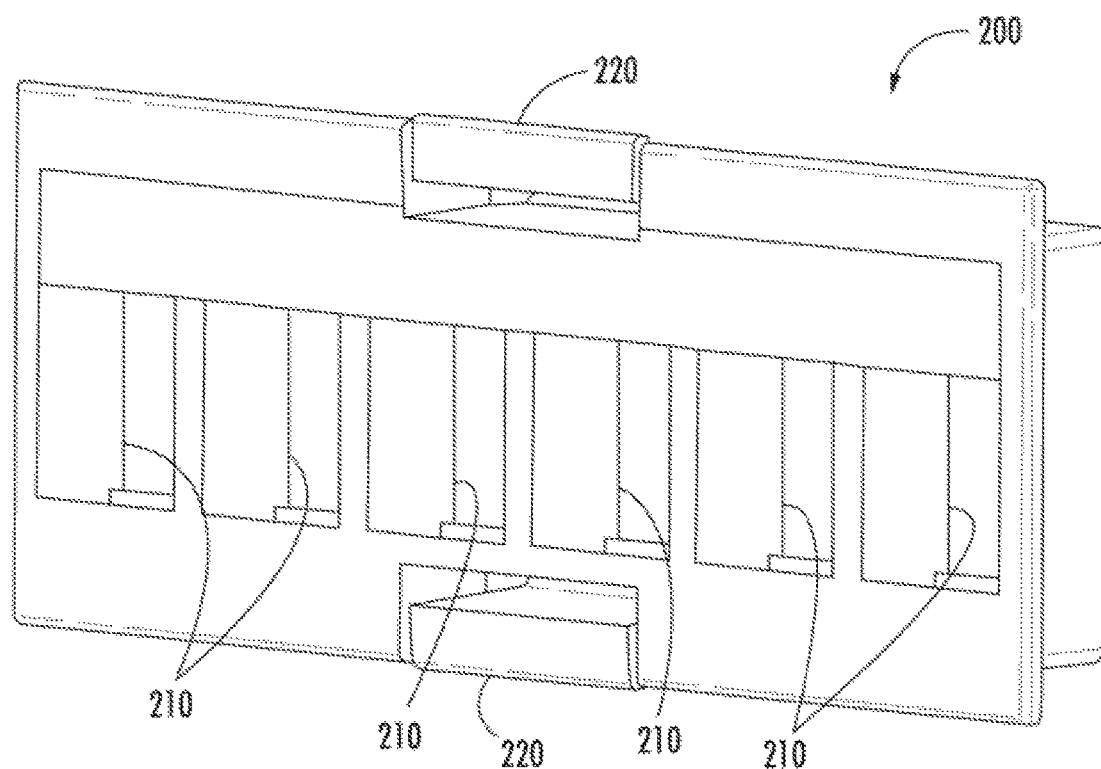

FIGS. 2A, 2B and 2C respectively illustrate front, rear and perspective views of a plastic intermediate modular adapter 200 in accordance with one nonlimiting embedment. The cutouts 110 accommodate intermediate modular adapters 200. Each intermediate modular adapter 200 has multiple openings 210 sized and configured for accommodating multiple connectors (connectors 300 are shown beginning in FIG. 3). There are six openings 210 designed to mount six corresponding KMJ style connectors on the plastic intermediate modular adapter 200. In the middle of the adapter 200, there are two latches 220, one approximate the top and the other approximate the bottom, which are utilized to mount the plastic intermediate modular adapter 200 on the metal mounting panel 100. Other configurations of the plastic intermediate modular adapter 200 are available for various types of connectors.

Figure 3:
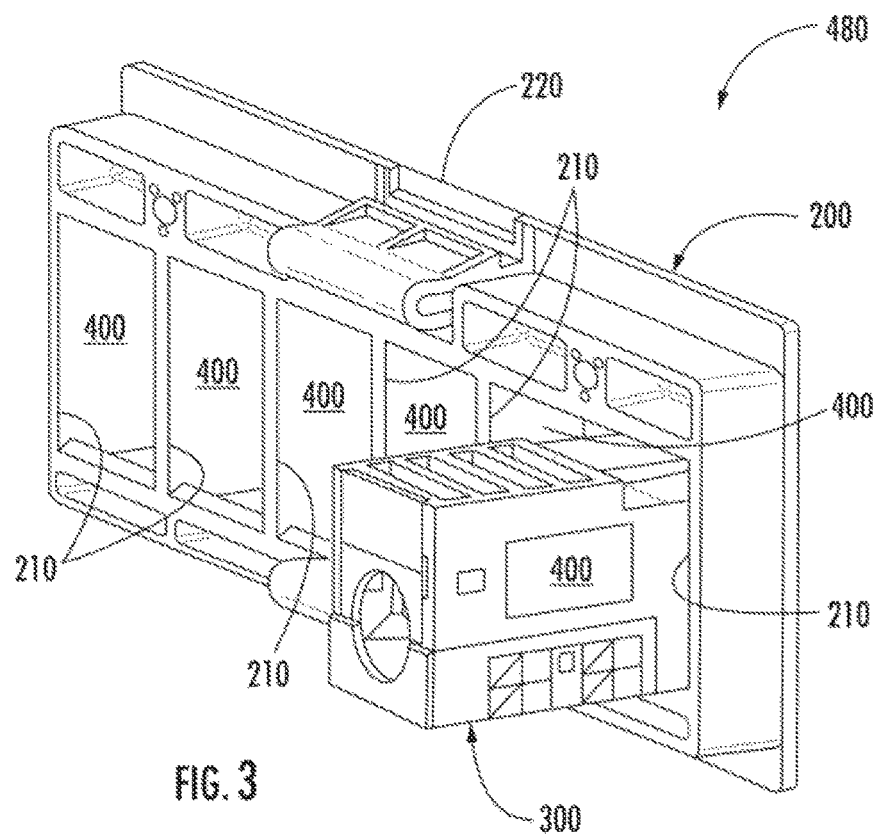
FIG. 3 is a perspective view illustrating the plastic plated modular adapter of the present invention and including connector secured thereto.

Referring to FIG. 3, a connector 300 is inserted into one opening 210 of the plastic intermediate modular adapter 200. The plastic intermediate modular adapter 200 is plated all around its outer surface, wherein the plated plastic 400 is on the top side of the adapter 200. The connector 300 is also plated on its outside surface, wherein the plated plastic 400 is on the top side of the connector 300. When the connector 300 is inserted within one opening 210 of the plastic intermediate modular adapter 200, the plated plastic 400 on the outer surface of the connector 300 and the plated plastic 400 of the inner surface of the opening 210 are electrically connected. Thus, the connector 300 and the plastic intermediate modular adapter 200 are electrically integrated into a conductive assembly 480. Similarly, more connectors 300 can be inserted into additional openings 210.

Figure 4:
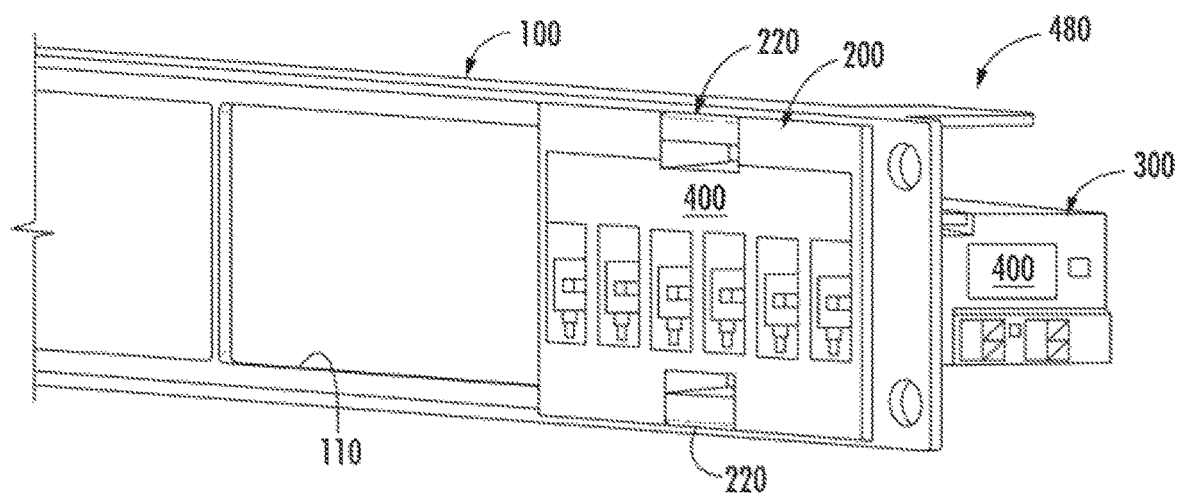
FIG. 4 is an isolated perspective view of the plastic plated modular adapter assembled to a metal panel frame.

Referring now to FIG. 4, one plastic intermediate modular adapter 200 accommodating six connectors 300 is mounted on one cutout 110 of the metal mounting panel 100. As described in FIG. 3, the connections between the plastic intermediate modular adapter 200 and the connectors 300 are through plastic plating. The connections between the plastic intermediate modular adapter 200 and the metal mounting panel 100 are through the direct connection of the plastic plating on the plastic intermediate modular adapter 200 and the unpainted surface of the metal mounting panel 100. As a result, the shielded metallic element in the connector 300 directly connects with the plastic intermediate modular adapter 200 into a conductive assembly 480. Such a conductive assembly 480 is mounted on the metal mounting panel 100 and directly connects with the unpainted surfaces on the metal mounting panel 100 and then with a panel frame that is connected to the ground structure. The grounding connection is completed from the connector 300 to the metal mounting panel 100 through a plastic intermediate modular adapter 200.

The plated adapter could also be designed for use in conjunction with un-shielded style connectors as a means of mitigating alien crosstalk between connectors, which is a growing concern with all category levels of data adapters since the introduction of the IEEE 802.3bz standard. This standard describes Ethernet data rates of 2.5 and 5 Gb/s over installed infrastructure. The plated modular adapter would allow end users to replace only the panel portion of the data channel, while allowing them to use currently installed connectors in the event that the alien crosstalk of the channel does not meet the requirements of the 802.3bz standard.

Figure 5:
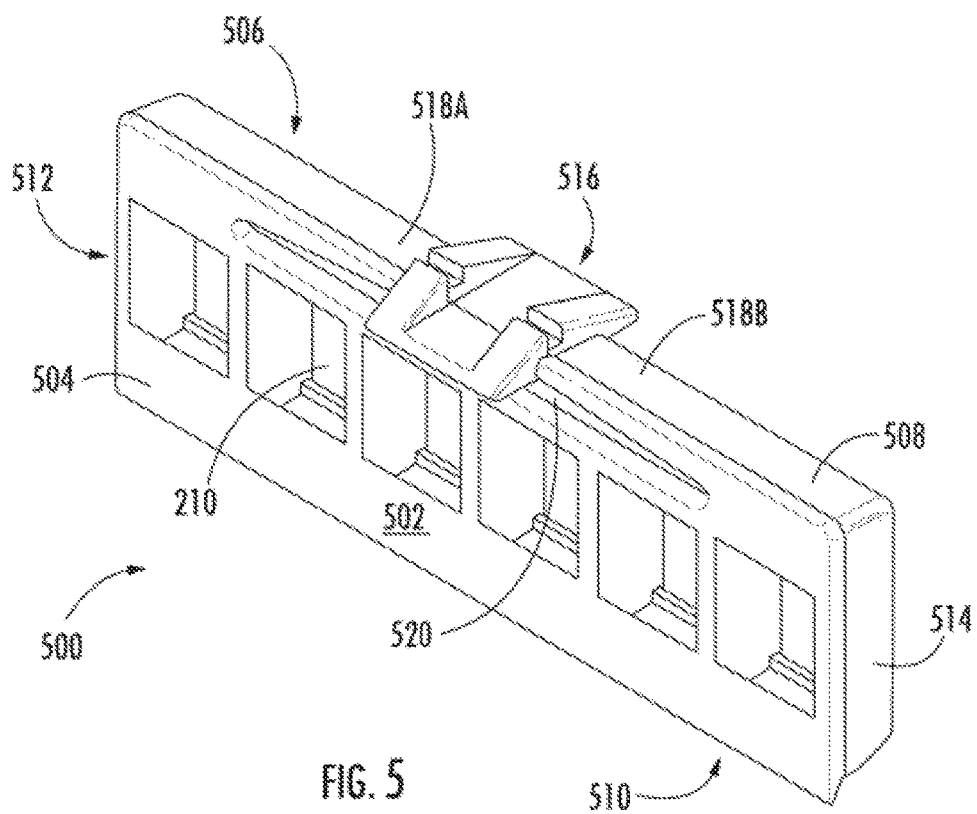
FIG. 5 is a perspective view of one embodiment of a bidirectionally insertable modular adapter.

FIG. 5 is a front perspective view of a bidirectional intermediate modular adapter 500. This bidirectional intermediate modular adapter 500 can be installed from the front side or the rear side of the panel 100 (FIG. 1). The bidirectional intermediate modular adapter 500 has a body 502 which includes a plurality of connector openings 210 into which connectors 300, such as RJ-45 receptacles, may be installed. The body 502 of the bidirectional intermediate modular adapter 500 has a first face 504, such as a front face, a second face 506, such as a rear face, a flexible top surface 508, an opposing bottom surface 510, a left-side surface 512, an opposing right-side surface 514. The flexible top surface 508 comprises a latch 516, flexible beams 518A, 518B, and a deformable opening 520. The bidirectional intermediate modular adapter 500 also has plated plastic surfaces 400 as described above.

Figure 6:
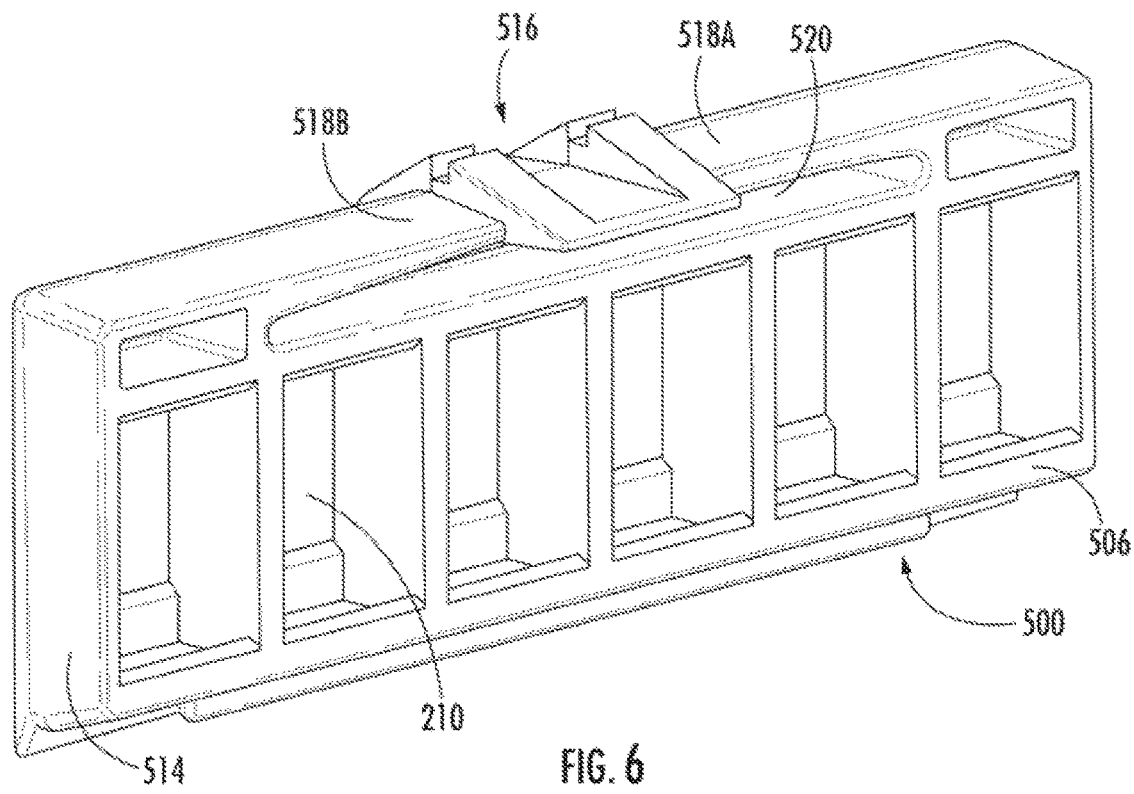
FIG. 6 is a rear perspective view of the bidirectionally insertable modular adapter.

FIG. 6 is a rear perspective view of the bidirectional intermediate modular adapter 500 showing the openings 210, the second face 506, the right side surface 514, the latch 516, the flexible beams 518A, 518B, and the deformable opening 520. The latch 516 is between, supported by, and connected to, the flexible beams 518A, 518B. The deformable opening 520 is defined by the latch 516 and the flexible beams 518A, 518B. When downward pressure is exerted on the latch 516 such as when the bidirectional intermediate modular adapter 500 is being inserted into a cutout 110, the flexible beams 518A, 518B deflect downward, thereby allowing the latch to be pushed downward, and thereby deforming the opening 520. When the pressure is released, such as when the bidirectional intermediate modular adapter 500 has been inserted into a cutout 110, or removed from the cutout 110, the flexible beams 518A, 518B urge the latch 516 upward to enlarge or restore the deformable opening 520.

Figure 7:
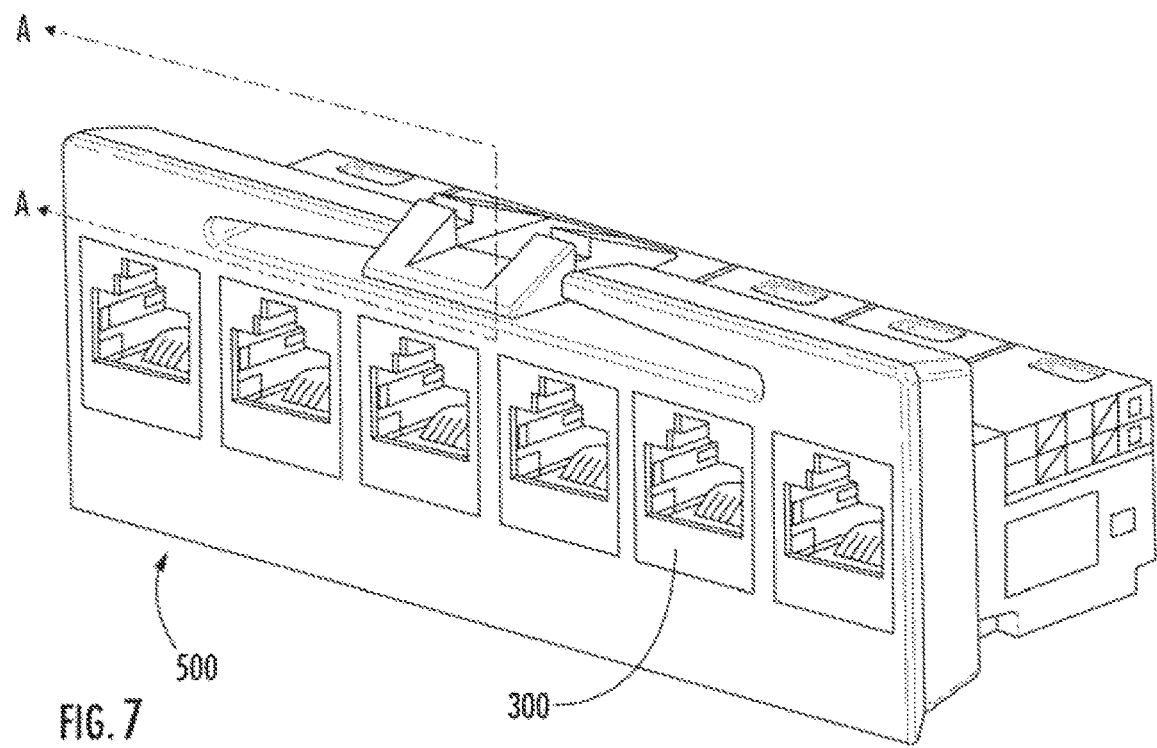
FIG. 7 is a front perspective view of the bidirectional modular adapter showing connectors installed.

FIG. 7 is a front perspective view of the bidirectional intermediate modular adapter 500 showing connectors 300 installed therein, and also indicating cutaway line A-A.

Figure 8:
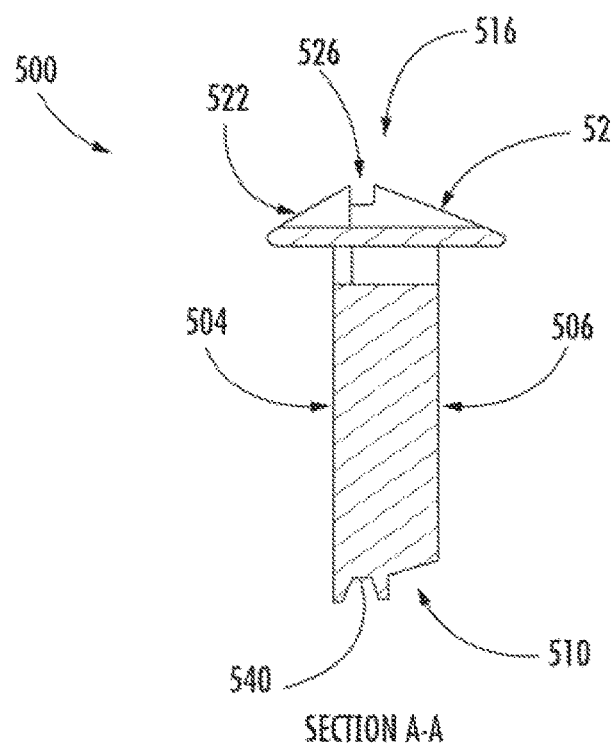
FIG. 8 illustrates a cutaway view along line A-A of FIG. 7.

FIG. 8 illustrates a cutaway view of the bidirectional intermediate modular adapter 500 along line A-A of FIG. 7, and shows a top groove 526 and a bottom groove 540. The grooves 526, 540 accept the top and bottom edges 105 of the metal mounting panel 100.

The top groove 526 is formed between a first ramp 522 and a second ramp 524. The first ramp 522 extends from the top groove 526 to at least the first face 504, and preferably extends beyond the first face 504. The second ramp 524 extends from the top groove 526 to at least the second face 506, and preferably extends beyond the second face 506. The top groove 526 may be centered between the first face 504 and the second face 506, or may be positioned off-center. As shown, the top groove 526 is positioned off center, being closer to the first face 504. The slope or angle of ramps 522 and 524 may be the same or they may differ from each other. As shown, the first ramp 522 has a slope which is greater than the slope of the second ramp 524. The first ramp 522, the second ramp 524, and the top groove 526 are part of the latch 516. It will be appreciated that the groove 526 may be defined, at least in part, by the ramps 522, 524.

The bottom groove 540 is formed on the bottom surface 510 of the bidirectional intermediate modular adapter 500. The bottom groove 540 may be centered between the first face 504 and the second face 506, or may be positioned off-center. As shown, the bottom groove 540 is positioned off center, being closer to the first face 504. The bottom groove 540 is shown as extending across a substantial portion of the bottom surface 510. The bottom groove 540 may, if desired, be longer or shorter but it should be long enough to retain the bidirectional intermediate modular adapter 500 in the mounting panel 100 under typical environmental stresses and conditions.

If the top groove 526 and the bottom groove 540 are in the same plane then the first face 504 may be in the same plane as the mounting panel 100. Alternatively, the top groove 526 and the bottom groove 540 may be in different planes so as to cause the first face 504 to incline slightly upward or slightly downward, if such inclination is more convenient, in a particular installation, for access to the connectors 300.

Figure 9:
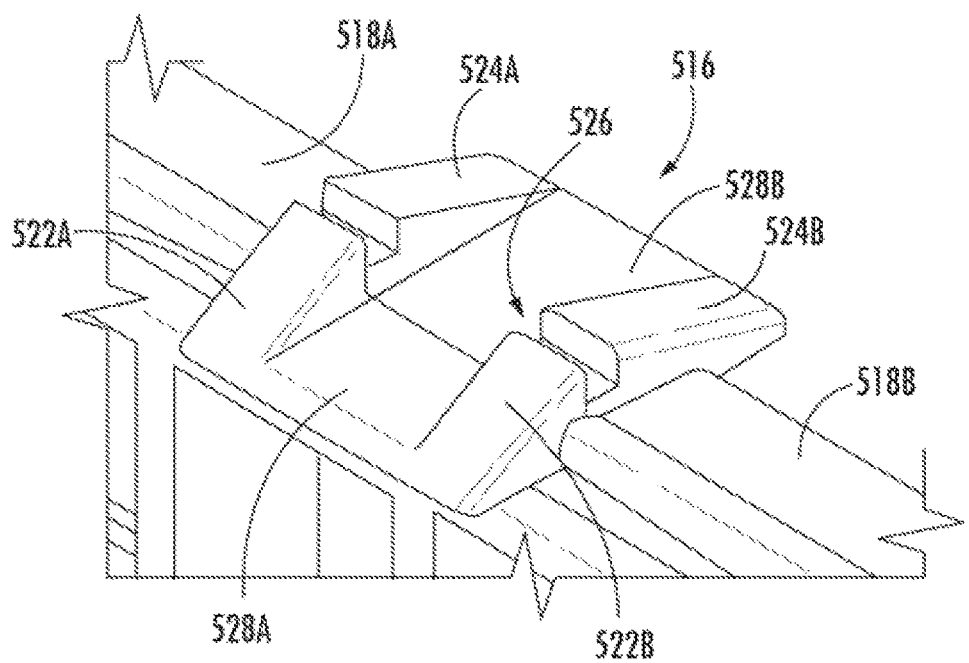
FIG. 9 is a top perspective view of the latch.

FIG. 9 is a top perspective view of the latch 516 and shows the front ramps, 522A, 522B, the rear ramps 524A, 524B, the top groove 526, and landings 528A, 528B. Landing 528A is between the ramps 522A and 522B. Landing 528B is between the ramps 524A and 524B. The landings 528A, 528B are preferably flat but may be, if desired, at a non-zero angle. Further, the angle of landing 528A may be the same as, or different from, the angle of landing 528B.

Latch 516 is shown in FIG. 5 as being approximately the width of a connector opening 210. This is a preference which is adequate for retention of the bidirectional intermediate modular adapter 500 in the mounting panel 100. It may, however, be wider if desired, such as in an environment where plugs are roughly inserted into or removed from the connectors 300, or narrower if desired, such as in an environment where less effort is preferable to depress the latch 516.

Also, the ramps 522A, 522B, 524A, 524B, are shown as being approximately 25% of the width of the latch 516, with the landings 528A, 528B being approximately 50% of the width of the latch 516. However, the ramps 522A, 522B, 524A, 524B may be a greater or smaller portion of the width of the latch 516, and the landings 528A, 528B may be a correspondingly smaller or greater portion of the width of the latch 516.

The deformable opening 520 is sufficiently large that the latch 516 can be depressed enough to allow the edge 105 to ride over the ramp and engage the groove 526.

The flexible beams 518A, 518B are flexible enough to allow the latch 516 to be depressed as discussed above, but sufficiently stiff to return the latch 516 to a position which engages the edge 105.

Figure 10:
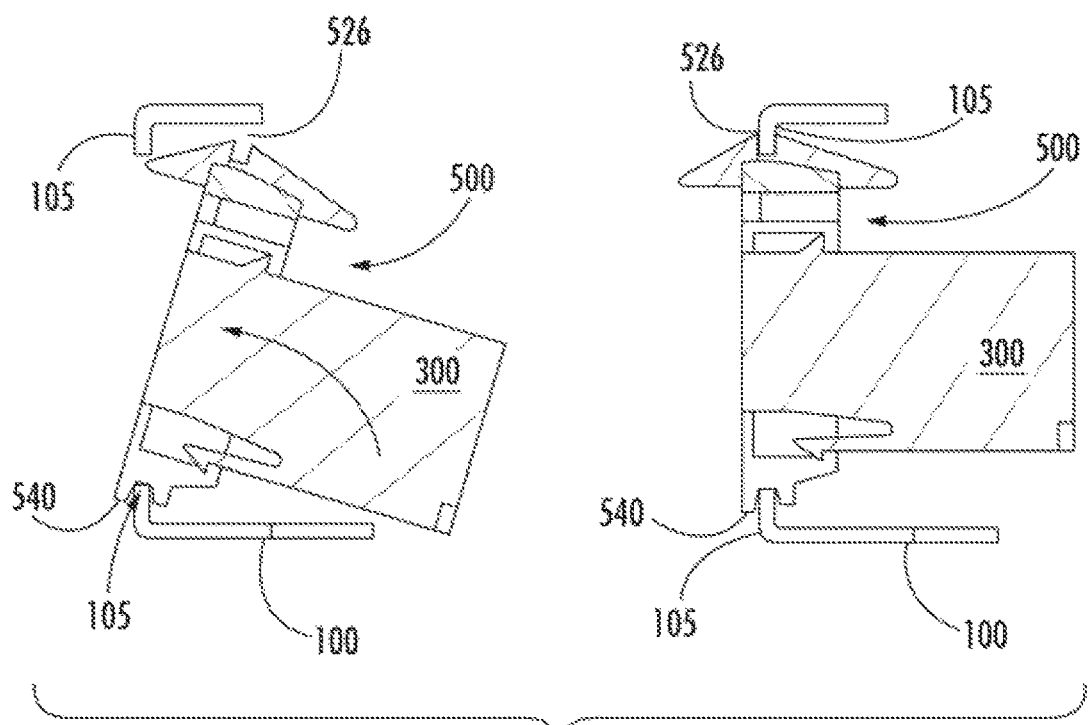
FIG. 10 illustrates installation of the bidirectional intermediate modular adapter from the rear side of a mounting panel.

FIG. 10 illustrates installation of the bidirectional intermediate modular adapter 500 from the back side of a mounting panel 100. The bottom groove 540 is placed over the edge 105, and then the bidirectional intermediate modular adapter 500 is rotated (counterclockwise in FIG. 10) toward the mounting panel 100 until the edge 105 locks into the top groove 526. As the bidirectional intermediate modular adapter 500 is rotated toward the mounting panel 100 the edge 105 will press down on the ramps 522A, 522B. The flexible beams 518A, 518B allow the latch 516 to deflect downward, thereby permitting the edge 105 ride over the ramps 522A, 522B and engage the top groove 526. A previously installed connector 300 is also shown. Alternatively, the connector 300 can be installed after the bidirectional intermediate modular adapter 500 is installed in the mounting panel 100.

Figure 11:
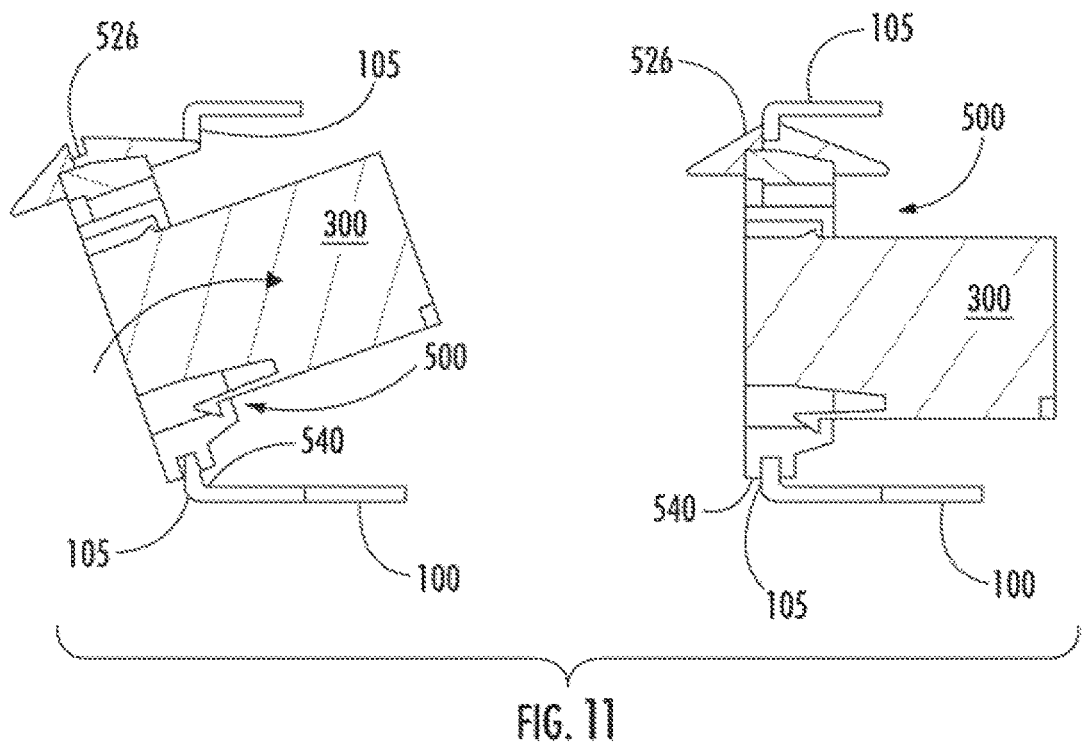
FIG. 11 illustrates installation of the bidirectional intermediate modular adapter from the front side of a mounting panel.

FIG. 11 illustrates installation of the bidirectional intermediate modular adapter 500 from the front side of a mounting panel 100. The bottom groove 540 is placed over the edge 105, and then the bidirectional intermediate modular adapter 500 is rotated (clockwise in FIG. 11) toward the mounting panel 100 until the edge 105 locks into the top groove 526. As the bidirectional intermediate modular adapter 500 is rotated toward the mounting panel 100 the edge 105 will press down on the ramps 524A, 524B. The flexible beams 518A, 518B allow the latch 516 to deflect downward, thereby permitting the edge 105 ride over the ramps 524A, 524B and engage the top groove 526. A previously installed connector 300 is also shown. Alternatively, the connector 300 can be installed after the bidirectional intermediate modular adapter 500 is installed in the mounting panel 100.

Removal of the bidirectional intermediate modular adapter 500 is easily accomplished by the user pressing down on one of the ramps 522A, 522B, or landings 528A, 528B, sufficiently to allow the top edge 105 to clear the top groove 526, rotating the bidirectional intermediate modular adapter 500 downward until the top edge 105 is no longer above the top groove 526, and lifting the bidirectional intermediate modular adapter 500 so that the lower groove 540 clears the lower edge 105. At this point the bidirectional intermediate modular adapter 500 has been disengaged from the mounting panel 100 and can be moved as desired.

Therefore, the ramps 522A and 522B on one side of the groove 526 and the ramps 524A and 524B on the other side of the groove 526, and 524 allow the bidirectional intermediate modular adapter 500 to be easily installed and removed from the front of the mounting panel 100 and easily installed and removed from the rear of the mounting panel 100.

Figure 12:
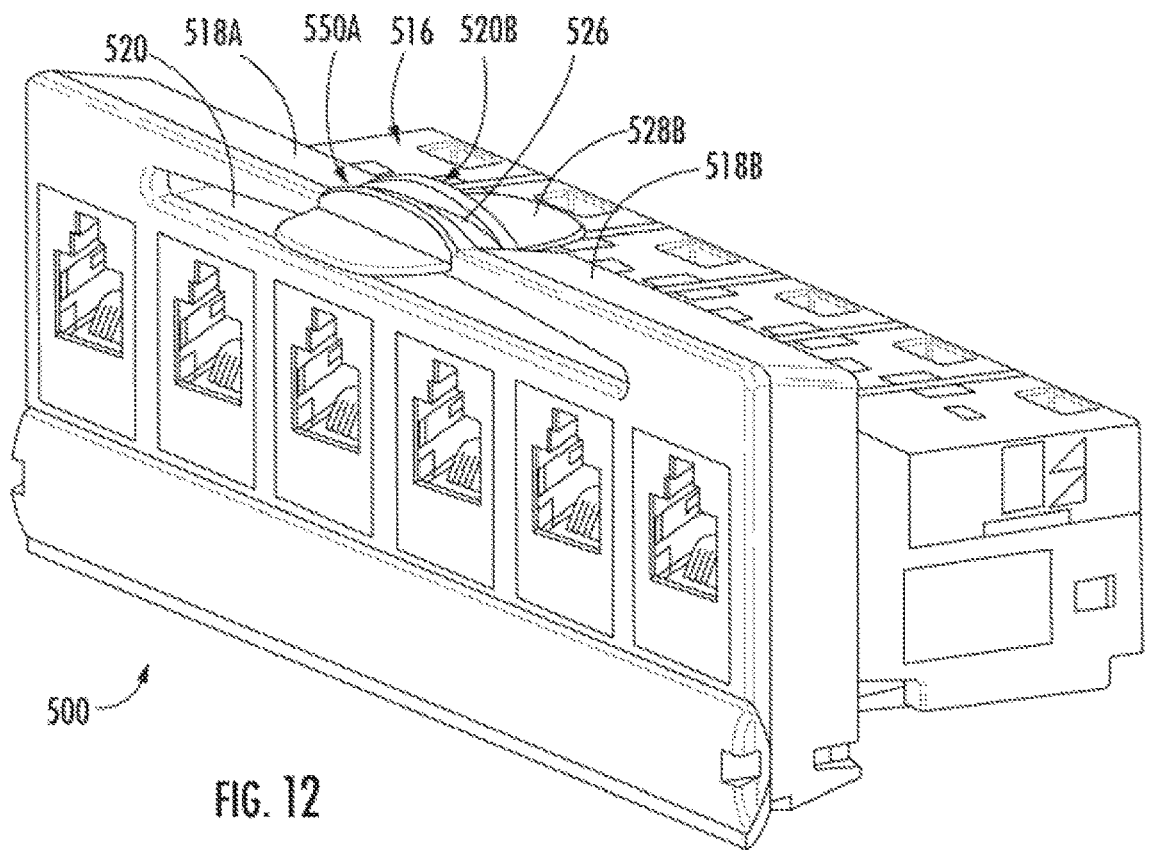
FIG. 12 is a perspective view of another embodiment of a bidirectionally insertable connector.

FIG. 12 is a perspective view of another embodiment of a bidirectional intermediate modular adapter 500. This embodiment does not have the ramps 522A, 522B of FIG. 5. In this embodiment, the latch 516 has landings or flat sections 528A, 528B. The landings 528A, 528B have stops or ridges 550A, 550B, at the inner ends thereof. The groove 526 is between the stops 550A, 550B. It will be appreciated that the groove 526 may be defined, at least in part, by the stops 550A, 550B.

To install the bidirectional intermediate modular adapter 500 the user places the lower groove 540 over the lower edge 105, presses down on one of the landings 528A, 528B sufficiently to allow the top edge 105 to clear the ridge 550A, 550B, rotates the bidirectional intermediate modular adapter 500 upward until the top edge 105 is over or in the top groove 526, and then releases the landing 528A, 528B.

Removal of the bidirectional intermediate modular adapter 500 is easily accomplished by the user pressing down on one of the landings 528A, 528B sufficiently to allow the top edge 105 to clear the ridge 550A, 550B, rotating the bidirectional intermediate modular adapter 500 downward until the top edge 105 is no longer above the top groove 526, and lifting the bidirectional intermediate modular adapter 500 so that the lower groove 540 clears the lower edge 105. At this point the bidirectional intermediate modular adapter 500 has been disengaged from the mounting panel 100 and can be moved as desired.

FIG. 13 is an exploded front perspective view of another embodiment of a bidirectional intermediate modular adapter 600, showing spring tab latch assemblies. Each intermediate modular adapter 600 has a plurality of openings 610 sized and configured for accommodating multiple connectors, such as RJ-45 receptacles or similar connectors, may be installed. The body of the bidirectional intermediate modular adapter 600 has a first face 606, such as a front face, a second face 608, such as a rear face, a left-side surface 612, and an opposing right-side surface 614. The bidirectional intermediate modular adapter 600 may also have plated plastic surfaces 400 as described above. The body of the bidirectional intermediate modular adapter 600 has an upper surface 640 and an opposing lower surface 642.

In this embodiment, a spring tab latch 602 is coupled with a compression spring 604, wherein both elements are seated within a spring tab latch receiver 616, allowing the spring tab latch 602 to be pushed inward.

The spring tab latch 602 has a latch groove 618 that is formed between a first ramp 622 and second ramp 624. The first ramp 622 extends from the latch groove 618 towards the first face 606. The second ramp 624 extends from the latch groove 618 towards the second face 608. The latch groove 618 may be centered between the first face 622 and the second face 624, or may be positioned off-center. As shown, the latch groove 618 is positioned off-center, being closer to the first face 606. The slope or angle of ramps 622 and 624 may be the same or they may differ from each other. The first ramp 622, the second ramp 624, and the latch groove 618 are part of the spring tab latch 602. It will be appreciated that the latch groove 618 may be defined, at least in part, by the ramps 622 and 624.

The latch groove 618 is sufficiently large that the latch groove 618 may be seated onto the frame of a mounting panel 100, thus securing the spring tab latch 602 to the frame of the mounting panel 100 when the spring tab latch 602 is not depressed. When the latch groove 618 is seated onto the frame of the mounting panel 100, the compression spring 604 provides the necessary force and pressure to retain the spring tab latch 602 to the frame of the mounting panel 100, thus securing the bidirectional intermediate modular adapter 600 to the mounting panel 100.

The first ramp 622 and second ramp 624 have a respective first slope and second slope, which may be the same angle or may be different angles. The sloping of the first ramp 622 and second ramp 624 allow the bidirectional intermediate modular adapter 600 to be inserted into a mounting panel 100 without a user depressing the spring tab latch 602. When the bidirectional intermediate modular adapter 600 is inserted into a mounting panel 100 from the front, the slope of the second ramp 624 causes the spring tab latch 602 to be pressed inward against the compression spring 604, allowing the bidirectional intermediate modular adapter 600 to slide into the mounting panel 100. When the latch groove 618 reaches the frame of the mounting panel 100, the compression spring 604 provides sufficient outward force to seat the latch groove onto the frame of the mounting panel 100.

Similarly, when the bidirectional intermediate modular adapter 600 is inserted into a mounting panel 100 from the rear, the slope of the first ramp 622 causes the spring tab latch 602 to be pressed inward against the compression spring 604, allowing the bidirectional intermediate modular adapter 600 to slide into the mounting panel 100. When the latch groove 618 reaches the frame of the mounting panel 100, the compression spring 604 provides sufficient outward force to seat the latch groove around the frame of the mounting panel 100.

The spring tab latch 602 has a first latch arm 626 and a second latch arm 628. The first latch arm 626 extends from the first ramp 622 towards the first face 606. The second latch arm 628 extends from the second ramp 624 towards the second face 608. The first and second latch arms 626, 628 enable a user to depress the spring tab latch 602 when inserting or removing the bidirectional intermediate modular adapter 600 from a mounting panel 100.

FIG. 14 is a front perspective view of a bidirectional intermediate modular adapter 600, showing the spring tab latch 602 and compression spring 604 seated in the spring tab latch receiver 616. Top groove 638 is located on the upper surface 640 of the bidirectional intermediate modular adapter 600 and designed to be placed over the edge 105 of a mounting panel 100 when the bidirectional intermediate modular adapter 600 is inserted into a mounting panel 100. It will be appreciated that the top groove located on the upper surface 640 could, in an embodiment, be located on the opposing lower surface 642 without departing from the function and operation of the invention.

FIG. 15 is a top view of a bidirectional intermediate modular adapter 600, showing the first latch arms 626 and second latch arms 628. First latch arms 626 and second latch arms 628 may be depressed inward towards the center of the bidirectional intermediate modular adapter 600 sufficiently to allow the spring tab latch 602 to clear the frame of the mounting panel 100 and thus release the bidirectional intermediate modular adapter 600 from a mounting panel 100.

FIG. 16 is a front view of a bidirectional intermediate modular adapter, showing the spring tab latches 602 depressed, and thus flush with the edge of the bidirectional intermediate modular adapter 600.

FIG. 17 illustrates a cutaway view along line A-A of FIG. 16, showing a spring tab latch 602 assembly installed in a bidirectional intermediate modular adapter 600. Compression spring 604 is shown in a compressed state, as when the spring tab latch 602 is depressed inward by, for example, a user depressing the spring tab latch 602 via the first latch arm 626 and/or the second latch arm 628.

When depressed a sufficient amount, the spring tab latch 602 is flush with the exterior edge of the bidirectional intermediate modular adapter 600, allowing the bidirectional intermediate modular adapter 600 to be inserted or removed from a mounting panel 100. Additionally, the spring tab latch 602 may be depressed sufficient to have the spring tab latch 602 recessed inside the spring tab latch receiver 616, allowing the bidirectional intermediate modular adapter 600 to be inserted or removed from a mounting panel 100.

FIG. 18 is a rear perspective view of a mounting panel 100, showing a bidirectional intermediate modular adapter 600 installed in a mounting panel 100. This figure shows the second latch arms 628 being accessible from the rear of the bidirectional intermediate modular adapter 600 when installed in a mounting panel. This embodiment allows the bidirectional intermediate modular adapter 600 to be easily installed or removed from the back of the mounting panel 100.

FIG. 19 is a front perspective view of a mounting panel 100, showing a plurality of bidirectional intermediate modular adapters 600 installed therein.

FIG. 20 is an isolated view taken from FIG. 19, showing a depressed spring tab latch 602. Because the spring tab latch 602 is depressed, a user may remove the bidirectional intermediate modular adapter 600 from either the front or the back of the mounting panel 100.

FIG. 21 is an isolated view taken from FIG. 19, showing a spring tab latch 602 that is engaged with the frame of a mounting panel 100. In this view, the latch groove 618 of the spring tab latch 602 is seated around the frame of the mounting panel 100 and is held in place by the force exerted from the compression spring located inside the spring tab latch 602 assembly.

FIG. 22 is an exploded front perspective view of one embodiment of a bidirectional intermediate modular adapter 600, showing a writable surface 630 and a transparent window face 632. The writable surface 630 allows a user to label the bidirectional intermediate modular adapter 600 using a writing implement, such as a pen or pencil, for identification or other purposes. The transparent window face 632 may be composed of a sturdy, transparent material such as plastic, glass, or similar composition.

In one embodiment, the transparent window face 632 includes a plurality of window face tabs 634, located near the lateral end of the transparent window face 632. The first face 606 of the bidirectional intermediate modular adapter 600 includes a plurality of window tab receptors 636 for receiving and retaining the window face tabs 634, thus securing the transparent window face 632 to the first face 606. The writable surface 630 is placed between the transparent window face 632 and the first face 606, and is thus secured to the first face 606 when the transparent window face 632 is attached thereto.

In one embodiment, the transparent window face 632 includes a plurality of window face notches 646, located on the upper and lower edges of the transparent window face 632. The first face 606 of the bidirectional intermediate modular adapter 600 includes a plurality of first face clamps 648 for receiving and retaining the window face notches 646 for receiving and retaining the window face notches 646, thus securing the transparent window face 632 to the first face 606. The writable surface 630 is placed between the transparent window face 632 and the first face 606, and is thus secured to the first face 606 when the transparent window face 632 is attached thereto.

FIG. 23 is a front perspective view of a bidirectional intermediate modular adapter 600;

FIG. 24 is a front view of a mounting panel 100, showing a plurality of bidirectional intermediate modular adapters 600 installed.

FIG. 25 illustrates a cutaway view along line A-A of FIG. 24, showing installation of an embodiment of the bidirectional intermediate modular adapter 600 from the front of a mounting panel 100. The top groove 638 is placed under the edge 105, and then the bidirectional intermediate modular adapter 600 is rotated (counterclockwise in FIG. 25) towards the rear of the mounting panel 100 until the latch groove 618 of the spring tab latch 602 locks into the frame of the mounting panel 100.

FIG. 26 illustrates a cutaway view along line A-A of FIG. 24, showing installation of an embodiment of the bidirectional intermediate modular adapter 600 from the rear of a mounting panel 100. The top groove 638 is placed under the edge 105, and then the bidirectional intermediate modular adapter 600 is rotated (clockwise in FIG. 26) towards the front of the mounting panel 100 until the latch groove 618 of the spring tab latch 602 locks into the frame of the mounting panel 100.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

It will be further understood that the terms "includes," "comprises," "including," and/or "comprising" specify the presence of stated features, steps, operations, elements, and/or components, but do not preclude the presence or addition of one or more other features, steps, operations, elements, components, and/or groups thereof unless explicitly stated otherwise or the context clearly requires otherwise. The terms "includes," "has" or "having" or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

Those skilled in the art will recognize that modifications may be made to the implementation(s) disclosed herein without departing from the scope or spirit of the claimed subject matter. The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the exemplary embodiments and applications illustrated and described, and without departing from the spirit and scope of the following claims.

What has been described above includes examples of aspects of the claimed subject matter. It is, of course, not possible to describe every conceivable combination of components or methodologies for purposes of describing the claimed subject matter, but one of ordinary skill in the art may recognize that further combinations and permutations of the disclosed subject matter are possible. Accordingly, the disclosed subject matter is intended to embrace all such alterations, modifications and variations that fall within the spirit and scope of the appended claims.

Although the subject matter presented herein has been described in language specific to components used therein, it is to be understood that the appended claims are not necessarily limited to the specific component or characteristic thereof described herein. Rather, the specific components and characteristics thereof are disclosed as example forms of implementing the claims.

From the foregoing description of various embodiments of the invention, it will be apparent that modifications may be made therein. It is understood that these embodiments of the invention are exemplifications of the invention only and that the invention is not limited thereto.

The invention claimed is:

1. A bidirectional intermediate modular adapter comprising:
   a body comprising:
      a first face and an opposing second face;
      at least one opening extending from the first face through the body to the opposing second face;
      a first side surface comprising a first spring tab latch and a spring tab latch receiver;
      an opposing second side surface comprising a second spring tab latch and a spring tab latch receiver;
      an upper surface;
      an opposing lower surface; and
   wherein each of the spring tab latches comprises:
      a first ramp;
      a second ramp;
      a latch groove at the apex formed by the first ramp and the second ramp;
      a spring tab latch connector; and
      a compression spring.

2. The bidirectional intermediate modular adapter of claim 1, wherein
   the first ramp extends from the latch groove to at least the first face; and
   the second ramp extends from the latch groove to at least the opposing second face.

3. The bidirectional intermediate modular adapter of claim 1, wherein the first ramp has a first slope and the second ramp has a second slope, the first slope being equal to the second slope.

4. The bidirectional intermediate modular adapter of claim 1, wherein each of the spring tab latches further comprises:
   a first latch arm extending towards the first face; and
   a second latch arm extending towards the second face.

5. The bidirectional intermediate modular adapter of claim 1, further comprising:
   the first face including a plurality of window tab receptors;
   a transparent window face including a plurality of window face tabs, capable of being inserted into and retained by the window tab receptors; and
   a writable surface sized to be retained between the transparent window face and the first face.

6. The bidirectional intermediate modular adapter of claim 1, further comprising:
   the first face including a plurality of first face clamps;

a transparent window face including a plurality of window face notches, capable of being inserted into and retained by the first face clamps; and a writable surface sized to be retained between the transparent window face and the first face.

7. The bidirectional intermediate modular adapter of claim 1, wherein at least a portion of the body is coated with a conductive material.

8. The bidirectional intermediate modular adapter of claim 1, wherein at least a portion of the top groove is coated with a conductive material.

9. The bidirectional intermediate modular adapter of claim 1, wherein at least a portion of the bottom groove is coated with a conductive material.

10. The bidirectional intermediate modular adapter of claim 1, wherein:

the upper surface comprises a top groove extending at least partially lengthwise across the upper surface.

11. The bidirectional intermediate modular adapter of claim 10, wherein the top groove engages an upper edge in an opening in a mounting panel.

12. The bidirectional intermediate modular adapter of claim 1, wherein:

the opposing lower surface comprises a bottom groove extending at least partially lengthwise across the opposing lower surface.

13. The bidirectional intermediate modular adapter of claim 12, wherein the bottom groove engages a lower edge in an opening in a mounting panel.

14. The bidirectional intermediate modular adapter of claim 1, wherein the body is a nonconductive material.

15. The bidirectional intermediate modular adapter of claim 14, wherein at least a portion of the body is coated with a conductive material.

16. bidirectional intermediate modular adapter comprising:

a body comprising:

a front face and an opposing rear face;

at least one opening extending from the front face through the body to the opposing rear face;

a first side surface comprising a first spring tab latch and spring tab latch receiver;

an opposing second side surface comprising a second spring tab latchand spring tab latch receiver;

an upper surface comprising a groove extending at least partially lengthwise across the upper surface;

an opposing lower surface; and wherein each of the spring tab latch comprises:

a first ramp;

a second ramp;

a latch groove at the apex formed by the first ramp and the second ramp;

a spring tab latch connector; and a compression spring.

17. The bidirectional intermediate modular adapter of claim 16, wherein each of the spring tab latches comprises a first ramp with a first stop at an inner end thereof, a second ramp with a second stop at an inner end thereof, and a latch groove defined at least in part by the first stop and the second stop.

18. The bidirectional intermediate modular adapter of claim 16, wherein at least a portion of the body is coated with a conductive material.

19. The bidirectional intermediate modular adapter of claim 16, wherein at least a portion of the groove is coated with a conductive material.

20. A bidirectional intermediate modular adapter comprising:

a body comprising:

a front face and an opposing rear face, the front face being forward of a first side surface and a second side surface;

the first side surface comprising a spring tab latch and spring tab latch receiver and the opposing second side surface comprising a spring tab latch and spring tab receiver;

the spring tab latch comprising a first ramp positioned towards the front face and a second ramp positioned towards the opposing rear face, a groove defined at least in part by the first ramp and second ramp, a first latch arm positioned towards the front face, a second latch arm positioned towards the opposing rear face, a spring tab latch connector positioned towards the spring tab receiver, and a compression spring located inside the spring tab latch connector;

at least one opening extending from the front face through the body to the opposing rear face;

an upper surface comprising a groove extending at least partially lengthwise across the upper surface; and an opposing lower surface.

* * * * *